(12) United States Patent
Kuntz et al.

(10) Patent No.: US 7,130,328 B2
(45) Date of Patent: Oct. 31, 2006

(54) TIME HISTORY DISPLAY OF ORTHOGONAL CODE POWER LEVELS

(75) Inventors: Thomas L. Kuntz, Portland, OR (US); Kathryn A. Engholm, Beaverton, OR (US)

(73) Assignee: Tektronix, Inc., Beaverton, OR (US)

( * ) Notice: Subject to any disclaimer, the term of this patent is extended or adjusted under 35 U.S.C. 154(b) by 824 days.

(21) Appl. No.: 10/222,092

(22) Filed: Aug. 15, 2002

(65) Prior Publication Data

US 2004/0032897 A1    Feb. 19, 2004

(51) Int. Cl.
*H04B 1/707* (2006.01)
*G01R 13/00* (2006.01)

(52) U.S. Cl. .................. 375/140; 375/224; 702/60; 702/67

(58) Field of Classification Search ................ 375/130, 375/140, 141, 147, 224; 345/440, 440.1, 345/440.2; 370/241, 342; 702/57, 60, 61, 702/66–68
See application file for complete search history.

(56) References Cited

U.S. PATENT DOCUMENTS

| | | | |
|---|---|---|---|
| 4,870,348 A | | 9/1989 | Smith et al. |
| 6,519,227 B1 | * | 2/2003 | Koizumi ..................... 370/241 |
| 6,850,238 B1 | * | 2/2005 | Bryant et al. ............ 345/440.1 |

\* cited by examiner

*Primary Examiner*—Jay K. Patel
*Assistant Examiner*—David B. Lugo
(74) *Attorney, Agent, or Firm*—Francis I. Gray; Matthew D. Rabdau

(57) ABSTRACT

A time history display of orthogonal code power levels by spreading factor is generated by displaying each data record of code domain power as a line, with each point in the line representing a different code index and the color or brightness of each data point representing the associated base code power level. With the data records displayed as contiguous lines, as each new data record is acquired it is added as a new line of the display while the line representing the oldest data record is deleted from the display. For communications standards where the code spreading factor varies, both bit-reversed and Walsh code graphs are displayed to show the grouping of the sub-codes that make up a base code. In this way the time history display indicates timing and trend information to a user.

5 Claims, 3 Drawing Sheets

TIME HISTORY DISPLAY OF ORTHOGONAL CODE POWER LEVELS

BACKGROUND OF THE INVENTION

The present invention relates to the display of communication signal information, and more particularly to a time history display of orthogonal code power levels by spreading factor.

There are various methods for displaying the power of orthogonal codes in a code division multiple access (CDMA) signal. In a COMA signal using orthogonal codes, all of which are the same length (also known as spreading factor), the amount of power present in each code, i.e., code domain power (CDP), may be displayed by plotting the power in each code versus the code number index on a two-dimensional graph. This is a conventional and well-understood manner using linear index code order for displaying CDP information. Newer CDMA systems, such as cdma2000, now specify use of codes of varying spreading factors, i.e., of different lengths, which complicates the display of CDP. Specifically codes of smaller spreading factor when displayed in a CDP graph appropriate for the largest spreading factor code appear dispersed into multiple sub-codes at fixed distances determined by their relationship to the larger spreading factor code system, i.e., a code with a spreading factor of 16 when displayed on the code graph for a spreading factor of 128 has 8 sub-codes spaced 8 indices apart. Also the total code power of the lower spreading factor code is not correctly indicated by the power levels of the individual sub-codes. Both of these factors cause difficulty in interpreting the results of CDP calculations when codes of different spreading factor values are present.

U.S. Pat. No. 6,219,340 describes one method of displaying power levels for a CDMA signal having orthogonal codes with different spreading factors or code layers. In this display a power level for each active code channel is displayed using a vertical bar, with the width of the bar indicating in which code layer each active code channel is active. However this display does not highlight the relationship of sub-codes to the base code. This deficiency is remedied by co-pending U.S. patent application Ser. No. 09/919,690 filed Jul. 31, 2001 in which the relationship of sub-codes to the base code is indicated by using two graphs, one of which is in bit-reversed index code order to group the sub-codes of lower spreading factors together. Additionally a base code power indicator in the form of a horizontal bar extends across the sub-codes in the graph using Walsh code order, representing the spreading factor for the base code at a level representing the base code power. Another display method is disclosed in co-pending U.S. patent application Ser. No. 09/967,555 filed Sep. 28, 2001 in which a third dimension is used in the display of code domain power for orthogonal codes having different spreading factors.

These methods allow a user to see at any point in time which codes are active and at what power levels. Some methods also provide visualization of base code to sub-code relationships and spreading factors. However the nature of a live signal makes it very difficult to determine from a code power graph when the various codes become active and inactive, how widely distributed the various spreading factors are, or how to spot trends such as under-active and over-active codes because the graph updates many times per second, showing different data each time.

U.S. Pat. No. 4,870,348 describes a quasi-3-dimensional display referred to as a color spectrogram which shows a number of frequency spectra that were generated over time as a series of colored lines where color is used as a substitute for a third dimension. Each single line is a complete spectrum, with different frequencies being represented by different points along the line and the color of each point representing an amplitude at that frequency. This display has a pseudo-random, evenly-divided x-axis with a data resolution that is usually the same or greater than the display pixel resolution and that doesn't vary from one spectrum record to the next.

What is desired is a method of displaying a time history of orthogonal code power levels by spreading factor to allow users to quickly spot trends and determine timing relationships.

BRIEF SUMMARY OF THE INVENTION

Accordingly the present invention provides a time history display of orthogonal code power levels by spreading factor by displaying each data record of code domain power as a line, with each data point in the line representing a different code index and the color or brightness of the data point representing a base code power level for that data point. With the data records displayed as contiguous lines, as each new data record is acquired it is added as a new line of the display while the oldest data record is deleted from the display. For communications standards where the code spreading factor varies, both a bit-reversed and Walsh code graph are displayed to show the grouping of the sub-codes that make up a base code. The x-axis data resolution for the bit-reversed graph is a function of the spreading factor for the various codes. In this way the time history display indicates timing and trend information to a user.

The objects, advantages and novel features of the present invention are apparent from the following detailed description when read in conjunction with the appended claims and attached drawing.

DETAILED DESCRIPTION OF THE INVENTION

Figure 1:
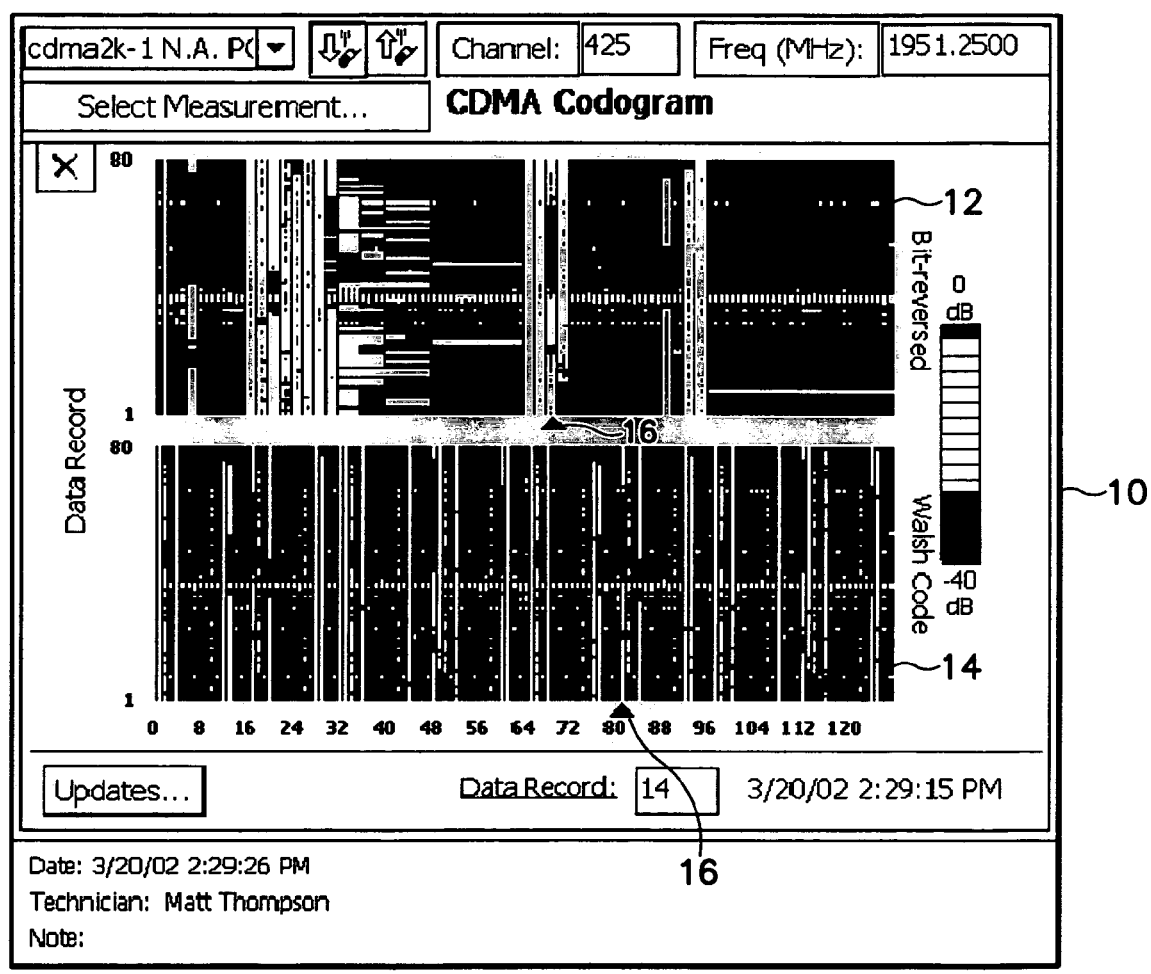
FIG. 1 is a plan view of a time history display according to the present invention.

Referring now to FIG. 1 a series of code domain power data records of power level versus code are displayed graphically 10 as contiguous parallel lines. Each point of each line, which corresponds to a code index, is displayed with a color or brightness to represent amplitude or power level. Then multiple data records, acquired one after the other, are lined up in parallel next to each other to clearly show amplitude or power level variances over time. A code index bit-reversed graph 12 shows base code power level as a color or brightness level. The base code power level is displayed as a single color or brightness level across each of the sub-codes at contiguous points in the data record representing the spreading factor for that base code. Base code power level is shown for each base code's set of sub-codes in the channel under test.

As subsequent records are acquired and processed, the previous record's display line is preserved and shifted upwards (or downwards) on the display screen 10 to make room for the new records one at a time at the bottom (or top). This allows the user to clearly see which codes are active, when they become active or inactive, what their spreading factors are and how much power is in each base code. Of course the display 10 may be rotated so that time is along the horizontal axis instead of the vertical axis.

By combining two graphs as shown, one 12—bit-reversed—organized by spreading factor (base codes) and the other 14—Walsh code—arranged by Walsh code index, a correlated pair of markers 16 may be used to indicate into which base code in the bit-reversed graph any sub-code in the Walsh code graph is grouped. This is useful for signal standards such as cdma2000 which group non-contiguous sub-codes together into the base codes. For WCDMA and other standards which group contiguous sub-codes into base codes, only the Walsh code graph 14 is needed to convey the timing, grouping and power level information. The display of the bit-reversed graph 12 has discrete x-values and the resolution is not restricted to regular intervals, as different spreading factors yield wider and narrower chunks to highlight them for the various codes.

Figure 2A:
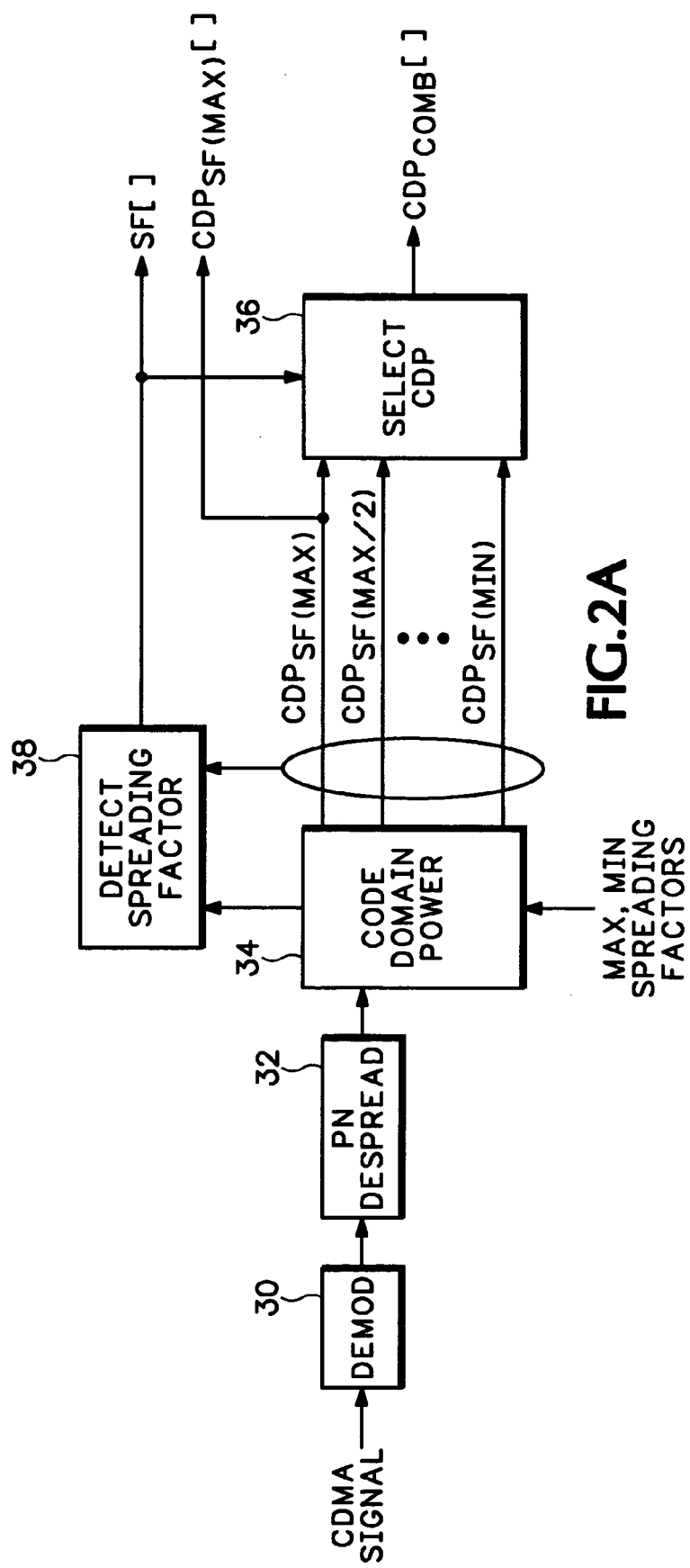
FIGS. 2A and 2B are a block diagram view of a system for displaying the time history display of FIG. 1 according to the present invention.
Figure 2B:
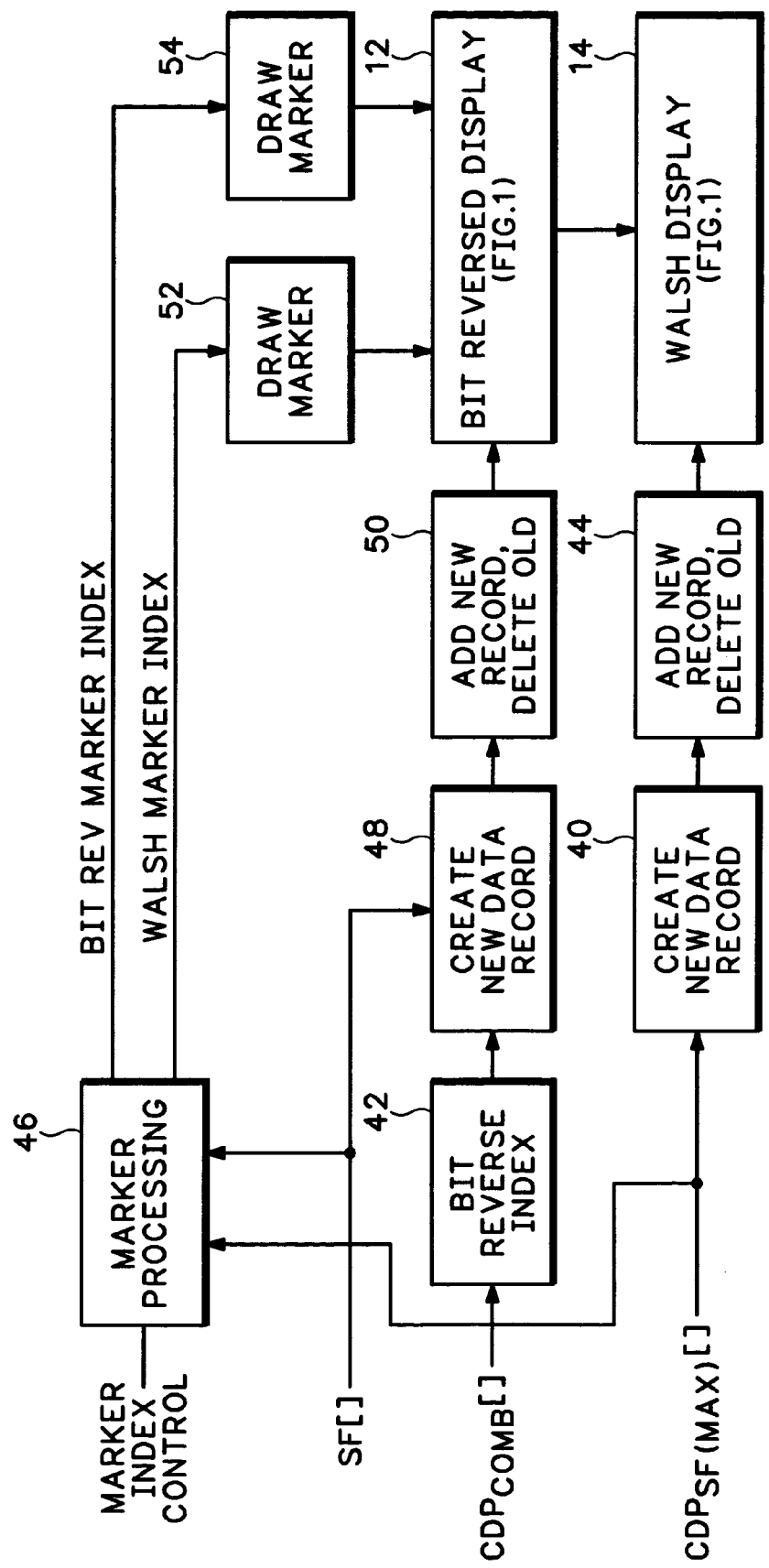

As shown in FIGS. 2A and 2B a CDMA signal is demodulated to baseband by a demodulator 30 and despread by a pseudo-random noise (PN) despreader 32. The resulting combined baseband CDMA signal is input to a code domain power analyzer 34 to which also are input the minimum and maximum spreading factors for the particular communication network, such as 4 and 128. The code domain power analyzer 34 divides the combined baseband CDMA signal to respective spreading factor CDP signals which are input to a CDP selector 36 and to a spreading factor detector 38. The spreading factor detector 38 determines the spreading factor associated with each code value, which spreading factor serves as a select signal for the CDP selector 36. The output from the CDP selector 36 is a combined CDP signal.

The maximum SF CDP signal is input to a record create generator 40 to produce a single line data record for each data acquisition for the linear index (Walsh) code graph 14, and to a marker generator 46. The output from the record generator 40 is input to a data record compiler 44 that adds the new data record line to a display memory section for the Walsh code graph 14 while deleting the oldest data record line (once the display memory section is full). The combined CDP signal is input to a bit-reverse indexer 42 followed by another record generator 48 to which also is input the spreading factor signal, and also is input to the marker generator 46 together with the spreading factor signal. The output from the record generator 48 is input to another data record compiler 50 that adds a new data record line to a display memory section for the bit-reversed code graph 12 while deleting the oldest data record line (once the display memory section is full). The marker generator 46 provides the numeric readouts for the display as well as signals to marker draw generators 52, 54 based further on a marker index control signal that indicates the code bar in one of the code graphs 12, 14 that is identified as a particular code bar by the user.

Thus the present invention provides a time history display for a communications signal by spreading factor in the form of two graphs in which parallel contiguous lines represent successive data records, the color or brightness level of each point along the lines represents amplitude or base code power level, and new data records are added to one edge of the graph as the oldest data records are deleted from the opposite edge of the graph.

What is claimed is:

1. A method of displaying a time history of orthogonal code power levels representing a communications signal by spreading factor comprising the steps of:
   displaying a first graph in code index bit-reversed order that groups sub-codes determined by a corresponding spreading factor together as base codes where each line of the first graph represents a data record for the communications signal and each data point in each line represents a code index for the communications signal with a shading value representative of a corresponding base code power level; and
   displaying a second graph in code index order where each line of the second graph represents the data record for the communications signal corresponding to that of the same line in the first graph and each data point in each line has the shading value representative of the corresponding base code power level.

2. The method of claim 1 further comprising the step of adding a new line to one edge of each graph as a new data record is acquired, shifting previously displayed lines, and deleting a line on an opposite edge of the graph representing an oldest data record.

3. A system for displaying a time history of orthogonal code power levels representing a communications signal by spreading factor comprising:
   a means for determining the codes, spreading factors, and base code power levels of acquired data records of the communications signal;
   a display having a display memory and a first graph in code index bit-reversed order that groups sub-codes determined by the corresponding spreading factor together as base codes where each line of the first graph represents a data record of the communications signal and each data point in each line represents the code index for the communications signal with a shading value representative of the corresponding base code power level; and
   the display having a second graph in code index order where each line of the second graph represents the data record of the communications signal corresponding to that of the same line in the first graph and each data point in each line has a shading value representative of the corresponding base code power level.

4. The system of claim 3 wherein each graph adds a new line to one edge of the graph as a new data record is acquired, previously displayed lines, and deletes a line on an opposite edge of the graph representing an oldest data record.

5. The system of claim 4 wherein the means for determining comprises:
   a demodulator for demodulating the communications signal to form a baseband communications signal;
   a pseudo-random noise despreader for despreading the baseband communications signal to form a combined baseband communications signal;
   a code domain power analyzer for dividing the combined baseband communications signal into respective spreading factor code domain power signals according to a minimum spreading factor and a maximum spreading factor;
   a spreading factor detector for determining the spreading factor associated with each spreading factor code domain power signal;
   a code domain power selector for receiving the spreading factor code domain power signals and an output of the spreading factor detector, and in response producing a combined code domain power signal;

a bit-reverse indexer for receiving the combined code domain power signal in response producing an output;

a first record generator for receiving the output of the bit-reverse indexer and the spreading factor signal and in response producing a single line data record;

a first data record compiler for receiving the single line data record of the first record generator and in response adding the new data record line to a display memory section for the first graph while deleting the oldest data record line;

a second record generator for receiving the maximum spreading factor code domain power signal and in response producing a single line data record;

a second data record compiler for receiving the single line data record of the second record generator and in response adding the new data record line to a display memory section for the second graph while deleting the oldest data record line; and a marker generator for receiving the spreading factor signal, the maximum spreading factor code domain power signal, and a marker index control signal, and in response producing numeric results for the display and signals to a first and second marker draw generators that indicate a code bar in one of the graphs that is identified as a particular code bar by the user.

* * * * *

UNITED STATES PATENT AND TRADEMARK OFFICE
CERTIFICATE OF CORRECTION

PATENT NO. : 7,130,328 B2  Page 1 of 1
APPLICATION NO. : 10/222092
DATED : October 31, 2006
INVENTOR(S) : Thomas L. Kuntz et al.

It is certified that error appears in the above-identified patent and that said Letters Patent is hereby corrected as shown below:

Col. 4, claim 4, line 47, --shifts-- should be inserted before "previously."

Signed and Sealed this

Third Day of July, 2007

JON W. DUDAS
*Director of the United States Patent and Trademark Office*